UNITED STATES PATENT OFFICE.

CARL BOSCH AND WILHELM WILD, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF BADEN.

PRODUCING HYDROGEN.

1,115,776.     Specification of Letters Patent.     Patented Nov. 3, 1914.

No Drawing.     Application filed June 30, 1913. Serial No. 776,548.

*To all whom it may concern:*

Be it known that we, CARL BOSCH and WILHELM WILD, citizens of the German Empire, residing at Ludwigshafen-on-the-Rhine, Germany, have invented new and useful Improvements in Producing Hydrogen, of which the following is a specification.

Attempts have been made to obtain pure hydrogen from water-gas by passing the water-gas mixed with steam over a catalytic agent, so that the carbon monoxid is converted into carbon dioxid and a further quantity of hydrogen is produced, the carbon dioxid and the excess of steam being removed from the gas by any suitable means. Such attempts have not hitherto led to satisfactory results, as the reaction proceeded only very incompletely.

We have now found that hydrogen can be obtained in an excellent manner by passing carbon monoxid, under which term we include carbon monoxid either as such or in the form of a mixture containing carbon monoxid, such for instance as water-gas and generator-gas, in admixture with steam over a catalytic agent containing iron, under which term we include both metallic iron and also iron oxid, provided the said iron be employed in a state of fine division and also provided that during the production of the catalytic agent and also during the production of the hydrogen a temperature of about 650° C. is not substantially exceeded. During the reaction, the iron becomes more or less oxidized, say, to ferro-ferric oxid or even a mixture of oxids may be obtained. Any iron compound may be employed at starting which, during the reaction, gives rise to iron oxid. The iron oxid, or the iron or iron compound which gives rise to iron or iron oxid, can be supported on carriers, or can be employed in the condition of a fine powder, or in a fine porous condition, and we prefer to make the catalytic agent in the form of porous lumps, briquets, or the like, because these are more easily arranged in the reaction space and the passage of the gas is rendered easy. Excellent results are obtained, for instance, by precipitating an oxid, hydroxid, or carbonate of iron from a solution of an iron salt, or by producing such compounds by heating a suitable salt, for instance oxalate, nitrate, or the like, while avoiding too high a temperature, and then, if desired, after moistening and adding a suitable organic or inorganic diluent or binding agent, forming the product into lumps, such for instance as cubes, rods, tubes, or the like, and heating them, either before or after the introduction thereof into the contact furnace. It is often advisable to add further substances which, upon being heated, evolve gas, either by decomposition or by complete volatilization, since this often enhances the porosity. The decomposition of such compounds can often be accelerated by passing gases such as air, carbon dioxid, furnace gas, water-gas, or the like, over the said compounds during the heating.

The lumps of iron oxid which are produced by burning iron pyrites and which, during their production, have been heated to higher temperatures than about 650° C. are not suitable for use according to this invention.

It is not essential to our invention that the practiser thereof shall be also the producer of the catalytic agent used, but it must be one which has been or shall be produced at a temperature not substantially exceeding 650° C. Such agent has been found to be non-sintered, and remains light and porous.

The production of hydrogen, when employing a contact agent prepared as hereinbefore described, can be effected by mixing water-gas or other gas containing carbon monoxid with an excess of steam, passing the mixture over the contact agent at a raised temperature and then removing the carbon dioxid and the excess of steam. Good results are obtained at temperatures of from 400° to 500° C., or even at lower temperatures.

The following examples will serve to illustrate methods of preparing and employing contact agents suitable for use according to this invention, but our invention is not confined to these examples. The parts are by weight.

Example 1: Add a solution of 100 parts of calcined sodium carbonate in 500 parts of water to a solution of 250 parts of ferrous sulfate in 500 parts of water. Filter off the precipitate and wash it, and then, without drying, mix it with 5 parts of slaked lime and dry until a paste is obtained which is then kneaded, rolled out, cut into cubes, dried and heated at about 500° C. Instead of slaked lime, an agent can be employed which decomposes upon being heated, such for instance as 14 parts of calcium nitrate, or a mixture of 14 parts of calcium nitrate and 6 parts of ammonium nitrate.

Example 2: Knead to a paste 10 parts of finely divided iron oxid, such for instance as the crocus martis of commerce, and a solution of 4 parts of aluminium nitrate in 4 parts of water. Form this paste into pieces of the desired shape, which then dry and heat at 400° C. in a current of air. In this example, the aluminium nitrate solution can be replaced by, for instance, a solution of 3.5 parts of magnesium nitrate in 3.5 parts of water.

Example 3: Melt 40 parts of crystallized ferric nitrate at from 50° to 60° C. and stir in a mixture of 5 parts of caustic lime, 15 parts of water and 2 parts of caustic potash. Then mix this product with 50 parts of precipitate which has been obtained according to the foregoing Example 1 and then dried, work the mixture in a kneading machine until a plastic mass is obtained, roll this out, cut it into cubes, dry it and heat at 500° C. If desired, pass over it a current of air or of carbon dioxid.

Example 4: Heat and stir ferric nitrate at 180° C. until its nitric acid is almost completely driven off, pass the residue through the finest sieve and mix 10 parts thereof with one part of calcined magnesia, moistening it with a solution of 1 part of potassium carbonate in 1.6 parts of water. Press the mass into briquets, dry them and heat to about 600° C.

Example 5: Boil 2.5 parts of wheat starch with 15 parts of water until a stiff paste is obtained, stir in 1 part of potassium carbonate, add 20 parts of iron oxid obtained by carefully heating iron oxalate to a temperature not exceeding 600° C. Knead the whole until a plastic mass is obtained, form it into briquets, dry it and heat at about 600° C. In this example, gum tragacanth, dextrin, or gum arabic, can be employed instead of the starch.

Example 6: Mix 9 parts of ferric oxid hydrate with 1 part, or more, of ferric oxalate and then work up the mixture to a paste with a solution of 2.5 parts of calcium nitrate in 2 parts of water. Press the paste into suitable shapes and dry slowly in a current of air at about 500° C. Then pass a mixture of pure carbon monoxid with an excess of steam over the catalytic agent thus obtained, while maintaining a temperature of about 500° C. The excess of steam and the carbon dioxid which is formed can be removed from the final reaction gases in any suitable manner. If, in this example, generator gas be employed instead of pure carbon monoxid, a mixture of nitrogen and hydrogen is finally obtained.

Example 7: Pass a current of carbon monoxid mixed with steam over iron in a state of fine division which has been preferably molded in a briquet press, at the same time gradually heating the catalytic agent, but avoiding temperatures above 600° C.

Example 8: Mix ferric oxid hydrate with sufficient concentrated calcium nitrate solution to obtain a paste of suitable consistency, then bring this paste into suitable shapes and dry it in the contact furnace while gradually raising the temperature to about 500° C. Then pass a mixture of carbon monoxid and steam over the catalytic agent, while avoiding temperatures above 600° C. Even if the gases are passed rapidly through the reaction furnace, an almost complete conversion of the carbon monoxid into carbon dioxid takes place.

Example 9: Heat ferric nitrate to about 200° C. so as to convert it into the oxid. Moisten the latter with aluminium nitrate solution and then mold it into suitable shapes and heat it at about 400° C., until the nitrous gases are driven off. Then place the catalytic agent in the contact furnace and pass a mixture of carbon monoxid and steam through the furnace while avoiding temperatures above 600 C.

Now what we claim is:

1. The process of producing hydrogen which consists in passing a gas containing or consisting of carbon monoxid in admixture with steam over a catalytic agent containing divided iron oxid and which has been produced at a temperature below 650° C.

2. The process of producing hydrogen which consists in passing a gas containing or consisting of carbon monoxid in admixture with steam at a temperature below 650° C. over a catalytic agent containing divided iron oxid and which has been produced at a temperature below 650° C.

3. The process of producing hydrogen which consists in passing a gas containing or consisting of carbon monoxid in admixture with steam over a non-sintered catalytic agent containing divided iron oxid.

In testimony whereof we have hereunto set our hands in the presence of two subscribing witnesses.

CARL BOSCH.
WILHELM WILD.

Witnesses:
J. ALEC. LLOYD,
JOSEPH PFEIFFER.